(12) United States Patent
Corcoran et al.

(10) Patent No.: US 9,958,910 B2
(45) Date of Patent: *May 1, 2018

(54) SHAPE MEMORY ALLOY LOCKING MECHANISM

(71) Applicant: LENOVO ENTERPRISE SOLUTIONS (SINGAPORE) PTE. LTD., New Tech Park (SG)

(72) Inventors: Philip M. Corcoran, Palm Bay, FL (US); Eric A. Eckberg, Rochester, MN (US); Joseph D. Rico, Rochester, MN (US); Edward J. Seminaro, Milton, NY (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 759 days.

This patent is subject to a terminal disclaimer.

(21) Appl. No.: 14/446,701

(22) Filed: Jul. 30, 2014

(65) Prior Publication Data

US 2014/0338325 A1 Nov. 20, 2014

Related U.S. Application Data

(62) Division of application No. 13/154,091, filed on Jun. 6, 2011, now Pat. No. 8,827,331.

(51) Int. Cl.
*E05C 3/06* (2006.01)
*G06F 1/18* (2006.01)
(Continued)

(52) U.S. Cl.
CPC .............. *G06F 1/183* (2013.01); *G06F 1/187* (2013.01); *G11B 33/125* (2013.01);
(Continued)

(58) Field of Classification Search
CPC ........... Y10S 292/38; E05B 2015/0468; E05B 2015/0493; E05B 65/104; E05B 47/0009
(Continued)

(56) References Cited

U.S. PATENT DOCUMENTS 3,125,366 A * 3/1964 Cetrone et al. ........... E05C 1/16
292/169.14
4,319,659 A * 3/1982 Heckelman ............. E05B 83/24
180/271
(Continued)

FOREIGN PATENT DOCUMENTS

EP 1279784 A1 * 1/2003 ......... E05B 47/0009
EP 1300532 A1 * 4/2003 ......... E05B 47/0009

*Primary Examiner* — Carlos Lugo
(74) *Attorney, Agent, or Firm* — Jason Friday

(57) ABSTRACT

A hardware retention mechanism comprising a frame including a first guide shoulder and a pivot point; an actuator arm including a first guide post; and a first shape memory alloy wire strung between the first guide shoulder and the first guide post that rotates the actuator arm between a locked position and an unlocked position. The actuator arm is rotatable around the pivot point between a locked position and an unlocked position. In some embodiments, the frame may further comprise a second guide shoulder, the actuator arm may further comprise a second guide post, and a second shape memory alloy wire may be strung between the second guide shoulder and the second guide post that rotates the actuator arm between an unlocked position and a locked position.

12 Claims, 10 Drawing Sheets

(51) Int. Cl.
  *G11B 33/12* (2006.01)
  *H05B 3/00* (2006.01)
  *E05C 3/00* (2006.01)
  *E05B 65/10* (2006.01)
  *E05B 15/04* (2006.01)
  *E05B 47/00* (2006.01)

(52) U.S. Cl.
  CPC ......... *G11B 33/128* (2013.01); *H05B 3/0004* (2013.01); *E05B 47/0009* (2013.01); *E05B 65/104* (2013.01); *E05B 2015/0468* (2013.01); *E05B 2015/0493* (2013.01); *Y10S 269/903* (2013.01); *Y10S 292/38* (2013.01); *Y10T 292/1047* (2015.04); *Y10T 292/57* (2015.04); *Y10T 403/24* (2015.01)

(58) Field of Classification Search
  USPC .................................................. 292/201, 216
  See application file for complete search history.

(56) References Cited

U.S. PATENT DOCUMENTS

| | | | | |
|---|---|---|---|---|
| 5,684,448 A * | 11/1997 | Jacobsen | ............ | H01H 61/0107 337/123 |
| 5,771,742 A * | 6/1998 | Bokaie | ............ | B64G 1/22 337/140 |
| 6,008,992 A * | 12/1999 | Kawakami | ......... | E05B 47/0009 292/137 |
| 6,577,460 B1 | 6/2003 | Hanson | | |
| 6,785,133 B2 | 8/2004 | Barringer et al. | | |
| 6,851,260 B2 | 2/2005 | Mernoe | | |
| 6,868,515 B2 | 3/2005 | Hanson | | |
| 6,871,519 B2 * | 3/2005 | Butera | ............... | E05B 47/0009 292/DIG. 25 |
| 6,874,827 B1 * | 4/2005 | Dodson | ............... | E05B 17/0012 292/1 |
| 6,972,659 B2 | 12/2005 | von Behrens et al. | | |
| 7,270,135 B2 * | 9/2007 | Virgilio | ............... | A47L 15/4409 134/93 |
| 7,364,211 B2 * | 4/2008 | Niskanen | ............ | E05B 47/0009 292/201 |
| 7,380,843 B2 * | 6/2008 | Alacqua | ............. | E05B 47/0009 292/137 |
| 7,585,006 B2 * | 9/2009 | Alacqua | ............. | A47L 15/4259 292/244 |
| 7,625,019 B2 * | 12/2009 | Alacqua | ............. | E05B 47/0009 292/137 |
| 7,810,852 B2 * | 10/2010 | Alacqua | ............. | E05B 47/0009 292/144 |
| 7,914,054 B2 * | 3/2011 | Blake, III | ............... | B29C 45/16 292/173 |
| 8,827,331 B2 * | 9/2014 | Corcoran | ........... | G11B 33/125 269/903 |
| 9,243,427 B2 * | 1/2016 | Weber | ................. | E05B 47/0009 |
| 2003/0177974 A1 * | 9/2003 | Dominique | ........... | E05B 85/107 116/200 |
| 2005/0000574 A1 | 1/2005 | MacGregor et al. | | |
| 2005/0146147 A1 | 7/2005 | Niskanen et al. | | |
| 2005/0184533 A1 | 8/2005 | Hebenstreit et al. | | |
| 2006/0237277 A1 | 10/2006 | Bohan | | |
| 2008/0127684 A1 * | 6/2008 | Rudduck | ............. | E05B 47/0009 70/77 |
| 2009/0174195 A1 * | 7/2009 | Szilagyi | ................. | E05B 83/16 292/201 |

\* cited by examiner

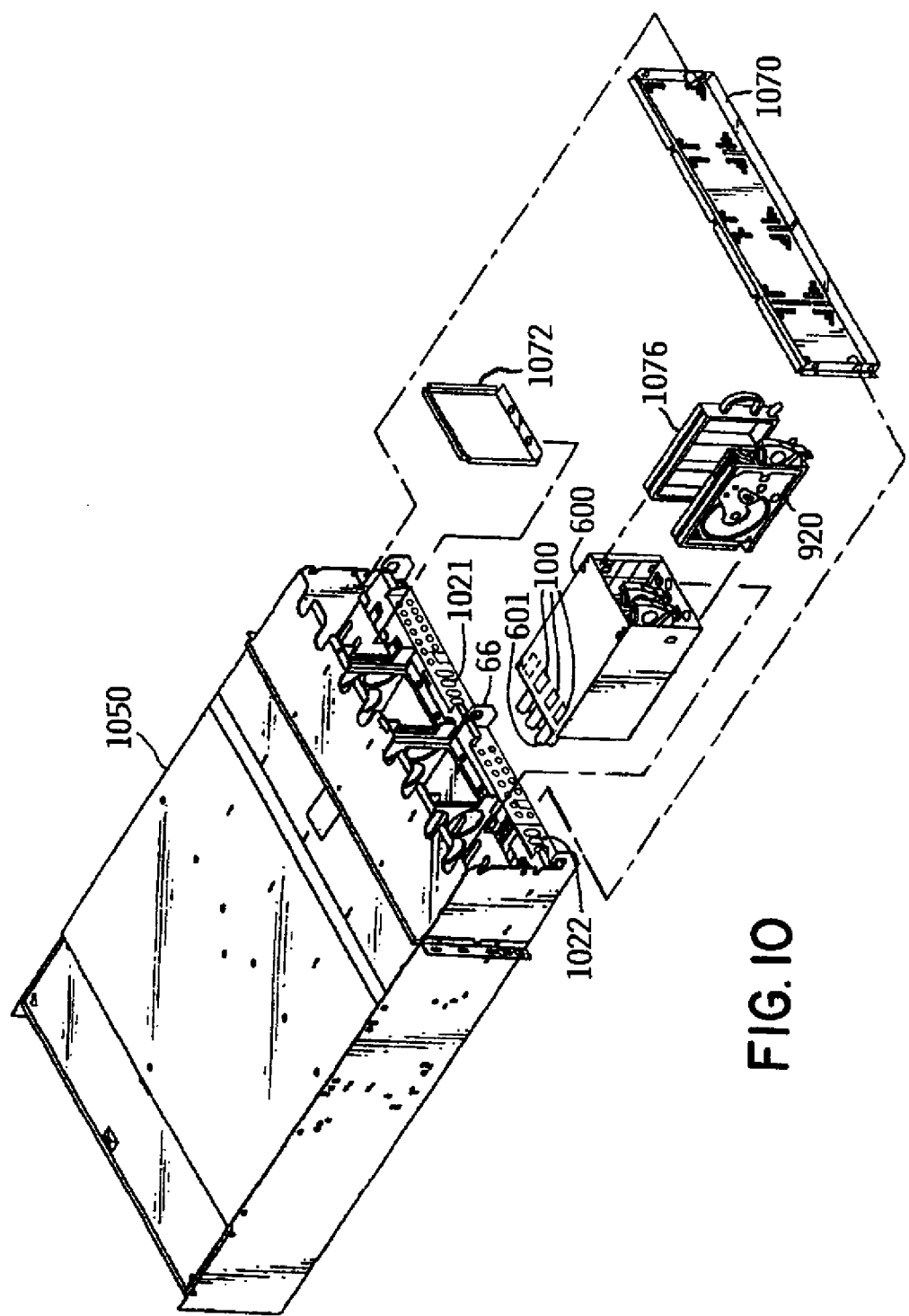

SHAPE MEMORY ALLOY LOCKING MECHANISM

FIELD OF THE INVENTION

The present invention generally relates to high-availability computers and servers, and more specifically to a small form factor latch utilizing shape memory alloy (SMA) actuators to implement computer-controlled retention of serviceable components.

BACKGROUND

The development of the EDVAC computer system of 1948 is often cited as the beginning of the computer era. Since that time, computer systems have evolved into extremely complicated devices. To be sure, today's computers are more sophisticated than early systems such as the EDVAC. Fundamentally speaking, however, the most basic requirements levied upon computer systems have not changed. Now, as in the past, a computer system's job is to access, manipulate, and store information. This fact is true regardless of the type or vintage of computer system.

High-availability (HA) computers are the result of a system design approach focused on maximizing system readiness, or conversely, on minimizing unplanned downtime. The key tools used by designers of these systems are redundancy and spare capacity. To facilitate redundancy and capacity, HA systems frequently utilize arrays of direct access storage devices (DASD), such as hard disk drives, organized and used in a redundant fashion. This allows each DASD device to be replaced without losing stored data. These arrays may often be combined with hot-swapping technology, which provides the ability to remove and replace hardware without interrupting the operation of the system/server. In this way, DASD's can be replaced without requiring the HA computer to be shutdown.

SUMMARY

Embodiments of the present invention allow for computer-controlled retention of components including, but not limited to, direct access storage devices ("DASD") by a high availability ("HA") device. This, in turn, reduces errors by allowing the HA system to control exactly which DASD components are replaced during a service call.

One aspect of the present invention is a hardware retention mechanism, one embodiment of which comprises a frame comprising a first guide shoulder and a pivot point; an actuator arm comprising a first guide post, and a first shape memory alloy wire strung between the first guide shoulder and the first guide post that rotates the actuator arm between a locked position and an unlocked position. The actuator arm is rotatable around the pivot point between a locked position and an unlocked position. In some embodiments, the frame may further comprise a second guide shoulder, the actuator arm may further comprise a second guide post, and a second shape memory alloy wire may be strung between the second guide shoulder and the second guide post that rotates the actuator arm between an unlocked position and a locked position.

Another aspect of the present invention is a disk drive frame locking mechanism, one embodiment of which comprises a frame comprising a plurality of guide shoulders and a pivot point; a carrier adapted to receive the frame, the carrier including a main latch adapted for selectable engagement with a receiver; an actuator arm comprising a plurality of integrated wire guide posts located between an integrated locking pin and an integrated over-center mechanism; a first set of redundant shape memory alloy wires, each strung between one of the plurality of guide shoulders and one of the plurality of integrated guide posts, that rotate the actuator arm around the pivot point when electrically heated such that the locking pin engages with the main latch, thereby preventing the main latch from being disengaged from the receiver; and a second set of redundant shape memory alloy wires, each strung between one of the plurality of guide shoulders and one of the plurality of integrated guide posts, that rotate the locking pin around the pivot point when electrically heated such that the locking pin disengages from the main latch, thereby allowing the main latch to be disengaged from the receiver. The over-center feature in this embodiment maintains a position of the actuator arm without external power.

Another aspect of the present invention is a method for selectively locking computer hardware. One embodiment comprises electrically heating a first shape memory alloy wire strung between a first guide shoulder of a frame and a first guide post of an actuator arm to rotate the actuator arm relative to the frame from an unlocked position into a locked position; and electrically heating a second shape memory alloy actuator wire strung between a second guide shoulder of the frame and a second guide post of the actuator arm to rotate the actuator arm relative to the frame from the locked position into the unlocked position. In some embodiments, the actuator arm includes an over-center feature that automatically maintains the actuator arm without electrical power in one of: the unlocked position and the unlocked position.

One feature and advantage of some embodiments of the present invention is that they help prevent a service technician from removing the wrong DASD device during a service call, thus helping prevent data loss. Some embodiments of the present invention may also be particularly desirable for use with DASD devices because they are lighter, cheaper, and smaller than conventional solenoids. In addition, solenoids operate using large magnetic fields, which can have detrimental effects in DASD carrier environments. These and other features and advantages of the present invention will become apparent from the following drawings and detailed description.

BRIEF DESCRIPTION OF DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 10 is a partially exploded front view of an enclosure.

DETAILED DESCRIPTION OF THE DRAWINGS

Figure 1:
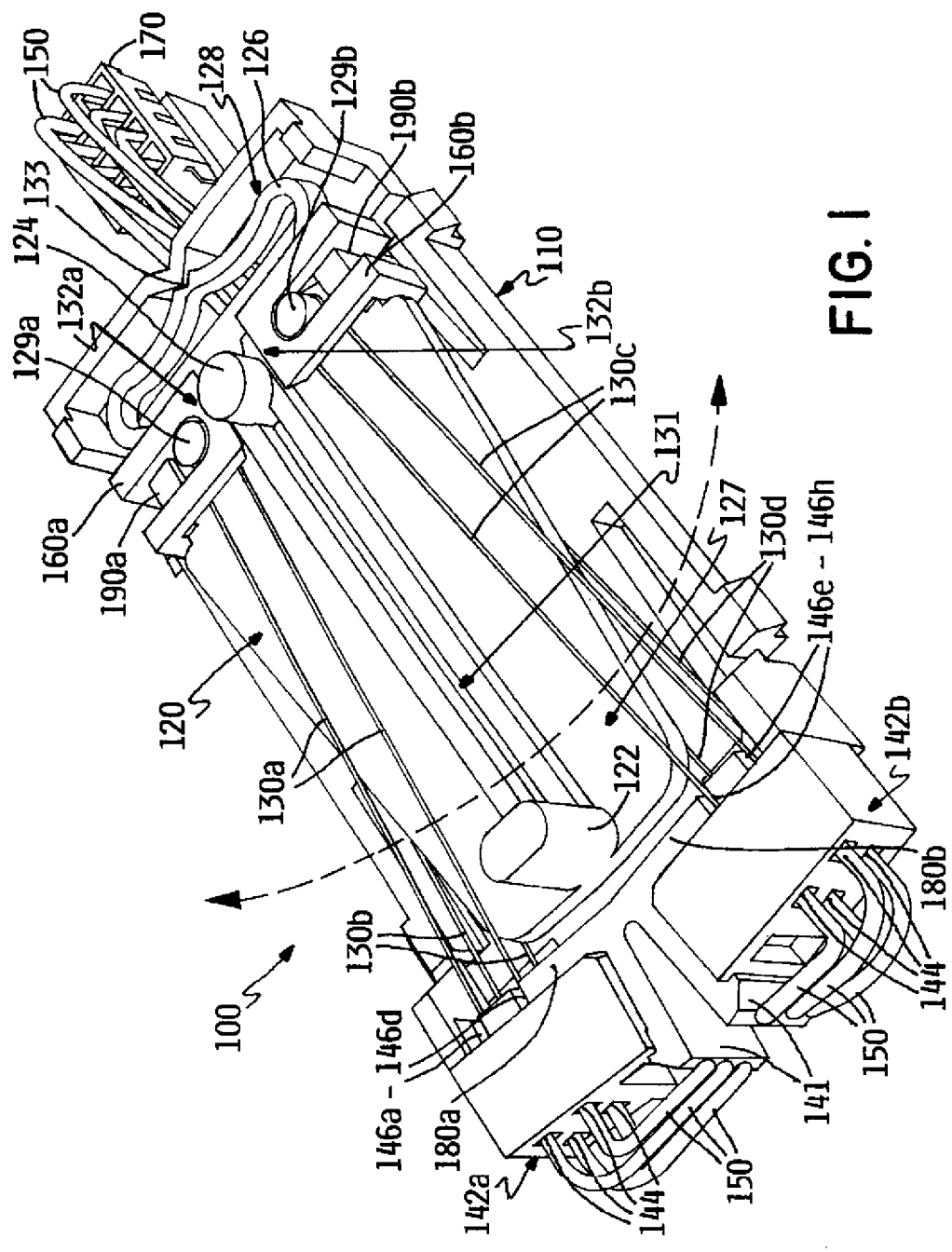
FIG. 1 illustrates one embodiment of a shape-memory-alloy (SMA) computer-controlled locking and unlocking mechanism.

FIG. 1 illustrates one embodiment of a computer-controlled locking mechanism 100. This embodiment 100 includes a frame 110, an actuator arm 120, a clockwise biasing wire connector 142a, and a counterclockwise wire connector 142b. The actuator arm 120, in turn, comprises a pivot pin 124, a locking pin 122 integrated into one end 127, an over-center mechanism 126 integrated into the opposite end 128, two guide posts 129a and 129b, and two stop blocks 190a-190b. The locking pin 122 and a center point 133 of the over-center mechanism 126 are axially aligned with the pivot pin 124 along a long axis 131 of the actuator arm 120. The guide posts 129a and 129b, in turn, are offset from the long axis 131 by lever arms 132a and 132b. The frame 110 in this embodiment includes two locking yokes 160a and 160b that hold the actuator arm 120 against the frame 110 and provide an opposing surface against which the stop blocks 190a-190b can be biased, a pivot guide hole 220 (FIG. 2), and two guide shoulders 180a and 180b. The locking yokes 160a and 160b and the guide posts 129a and 129b cooperate to allow the actuator arm 120 to pivot around the pivot pin 124 between a locked position and an unlocked position. Each guide shoulder 180a and 180b contains four guide slots 146a-146h, two on the upper surface of the shoulders 180a and 180b and two on the lower surface of the shoulders 180a and 180b.

The embodiment 100 further includes two sets of two shape-memory-alloy (SMA) biasing wires 130a-130d, for a total of four wires. Each SMA wire 130a-130d is held inside one of the wire connectors 142a and 142b by the shoulders 180a and 180b, strung through the integrated wire guide slots 146a-146h, and looped around the guide posts 129a and 129b. One set of SMA wires 130a-130b will pivot the actuator arm 120 in a clockwise direction around the pivot pin 124 when heated, while the other set of SMA wires 130c-130d will pivot the actuator arm 120 in a counter-clockwise direction around the pivot pin 124 when heated.

The wire connectors 142a and 142b in this embodiment slide into and along guide members 210-211 (FIG. 2) in the frame 110 and are held in place by an integrated flexible latch 141. Each wire connectors includes four vias 144 that individually and electrically connect one of four signal wires 150 to an end 430 (FIG. 4) of one of the SMA wires 130a-130d. A control connector 170, in turn, couples the signal wires 150 to DASD locking controller (not shown). The wire connectors 142a and 142b also securely fix the ends 430 of the SMA wires 130a-130d, thereby providing a point against which the SMA wires 130a-130d can pull when toggling the locking mechanism 100 between its locked and unlocked positions. In some embodiments, the guide members 210-211 and the flexible latches 141 may be further offset from the long axis 131 than are the guide posts 129a and 129b to provide additional actuation force.

In operation, when a high availability ("HA") device detects a fault condition in a direct access storage devices ("DASD") device, the HA device issues an unlock command to the DASD's locking controller (not shown). In response, the locking controller initiates an electrical current through one set of the SMA wires 130a-130b via the corresponding signal wires 150 and the control connector 170. This electrical current, in turn, heats the SMA wires 130a-130b, which causes the SMA wires 130a-130b to physically shorten in length. Because the ends of the SMA wires 130a-130b are held inside the wire connector 142a by the shoulder 180a and are looped around the guide post 129a, this physical effect will applying a biasing force against the actuator arm 120. The biasing force, in turn, pivots the actuator arm 120 counterclockwise around the pivot pin 124 with sufficient force to toggle the over-centering mechanism 126 (described in more detail with reference to FIG. 3). Once the over-centering mechanism 126 has been toggled, the locking controller can remove the electrical current from the SMA wire 130a; the over-center mechanism 126 will continue to provide sufficient force to hold the actuator arm 120 in its unlocked position. In this way, the locking mechanism 100 will remain unlocked, and operators able to remove the corresponding DASD from the HA device, even if the HA device itself subsequently loses power.

After a new drive is inserted, the HA device can issue a lock command to the DASD's locking controller (not shown). In response, the locking controller begins initiates an electrical current in the second set of the SMA wires 130c-130d via the corresponding signal wires 150 and the control connector 170. This electrical current, in turn, heats the SMA wires 130c-130d, which causes the SMA wires 130c-103d to physically shorten in length. Because the ends of the SMA wires 130c-130d are held inside to the wire connector 142b by the shoulder 180b and are looped around the guide post 129b, this physical effect will applying a biasing force against the actuator arm 120. The biasing force, in turn, will pivot the actuator arm 120 clockwise around the pivot pin 124 with sufficiently force to toggle the over-centering mechanism 126 (described in more detail with reference to FIG. 3) until one of the integrated stop blocks 190a-190b hits one of the locking yokes 160a-160b. Once the over-centering mechanism 126 has been toggled, the over-center mechanism 126 will continue to provide sufficient force to hold the actuator arm 120 in its unlocked position. In this way, the locking mechanism 100 will continue to hold the DASD carrier in the HA device, and prevent operators from accidentally removing the corresponding DASD, even if the HA device itself subsequently loses power.

Figure 2:
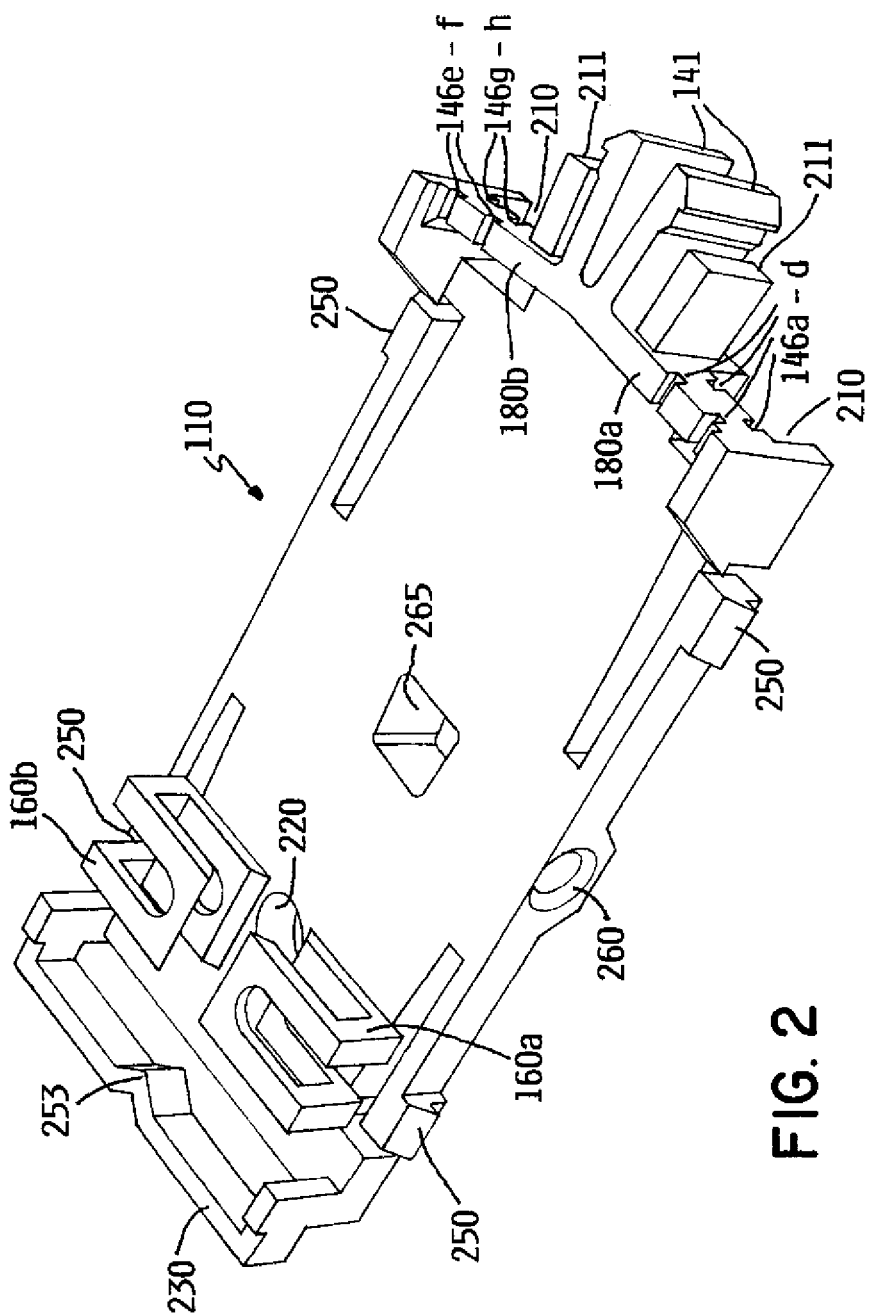
FIG. 2 illustrates one embodiment of the frame in more detail.
Figure 3:
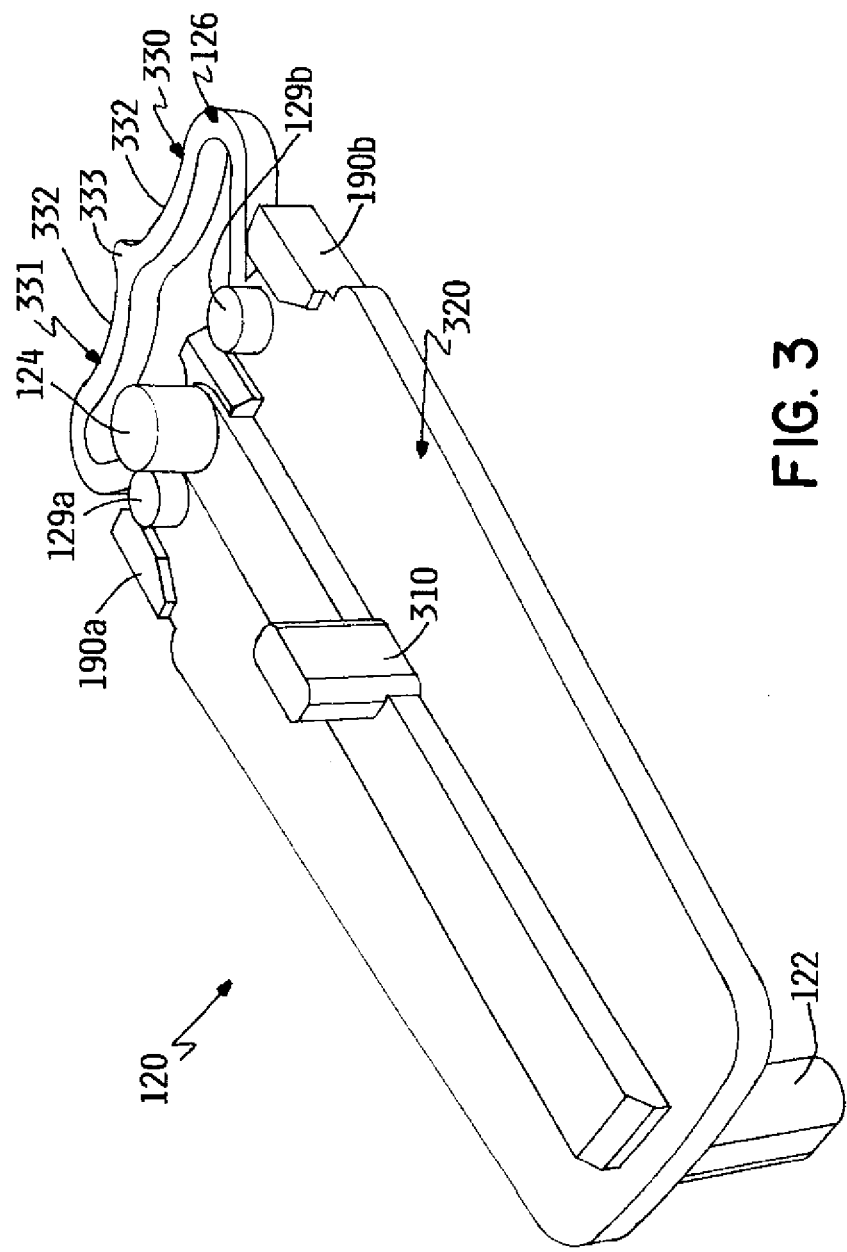
FIG. 3 illustrates one embodiment of the actuator arm in more detail.

FIG. 2 illustrates one embodiment of the frame 110 in more detail. This embodiment comprises an over-center latch bar 230 containing an integrated detent 253 approximately at its midpoint, two guide slots 210, two guide tabs 211, the two flexible latches 141, the pivot guide hole 220, the two locking yokes 160a and 160b, four flexible side latches 250, a manual override port 260, and a manual override slot 265. The wire connectors 142a and 142b (FIG. 1) slide-ably engage into the guide slots 210 and over the guide tabs 211, thereby preventing horizontal and vertical motion of the wire connectors 142a and 142b relative to the frame 110. The integrated flexible latches 141, in turn, prevent the wire connectors 142a and 142b from sliding off of the guide tabs 211 and out of the guide slots 210. The flexible side latches 250 are sized and positioned to engage corresponding slots in a carrier 600 (FIG. 6), thereby holding the frame 110 in place relative to that carrier 600. The pivot pin 124 (FIG. 3) rotates inside pivot guide hole 220, thereby allowing controlled rotational movement of the actuator arm 120 (FIG. 3) relative to the frame 110. The manual override port is adapted to receive a pin, or the like, and to guide the pin against a manual release tab 310 (FIG. 3). The manual release tab 310, in turn, slides inside the override slot 265 during normal and manual operation. This feature is desirable because it allows for manual override of the locking state if the SMA wire actuator mechanism fails.

The guide shoulders 180a and 180b and the pivot guide hole 220 in this embodiment 100 are both integrated into the frame 110, which ensures that the shoulders 180a and 180b and the pivot guide hole 220 are all located a prescribed distance from each other, and ensures that these distances can be reproduced with minimal variance. Moreover, because the pivot guide hole 220 establishes the location of the actuator arm 120 relative to the frame 110, this also ensures that the SMA wire ends 430 (FIG. 4) and the guide posts 129a and 129b are located a prescribed and reproducible distance from each other. This feature is desirable because SMA wires 130a-d will only contract by about 2-4% when heated.

FIG. 3 illustrates the actuator arm 120 in more detail. This actuator arm 120 embodiment comprises the integrated pivot pin 124, the integrated locking pin 122, the over-center mechanism 126, the guide posts 129a and 129b, an integrated rib structure 320 that improves bending strength of the actuator arm 120 at relatively minimal weight, a manual-release tab 310, and the integrated stop blocks 190a-190b. The integrated over-center mechanism 126, in turn, comprises a shaped spring 330 containing a cam profile 331 that cooperates with the detent 253 (FIG. 2) of the frame 110 to bias the actuator arm 120 away from a neutral position into either the locked/unlocked positions. In operation, as the actuator arm 120 pivots relative to the frame 110, the detent 253 slides along the cam profile 331 from a concave/low energy position 332 toward a convex/high energy position 333. The shaped spring 330, in turn, continuously biases the cam profile 331 against the detent 253, which tends to force the detent 253 away from the convex section 333 and into one of the concave sections 332. This pivots the actuator arm 120 relative to the frame 110 until the integrated stop blocks 190a-190b of the actuator arm 120 hits one of the locking yokes 160a-160b. That is, the outward force of the shaped spring 330 coupled with the shape of the cam profile 331 combine to create a 'tipping point' that tends to force the actuator arm 120 into either the locked position or the unlocked position, with the detent 253 always resting in one concave section 332 or the other. Movement of the actuator arm 120 applies force to the spring 330, until the actuator arm 120 crosses the tipping point of the convex section 333, at which time the spring 330 starts pushing the actuator arm 120 to the opposite convex section 333. Accordingly, in embodiments that include an over-center mechanism 126, it is important that the spring 330 and cam profile 331 be chosen to be both sufficiently mechanically rigid for purposes of maintaining one of the locked/unlocked states, and sufficiently flexible that one of the SMA wires 130a, 130b, 130c, or 130d can overcome its biasing force when heated.

Figure 6:
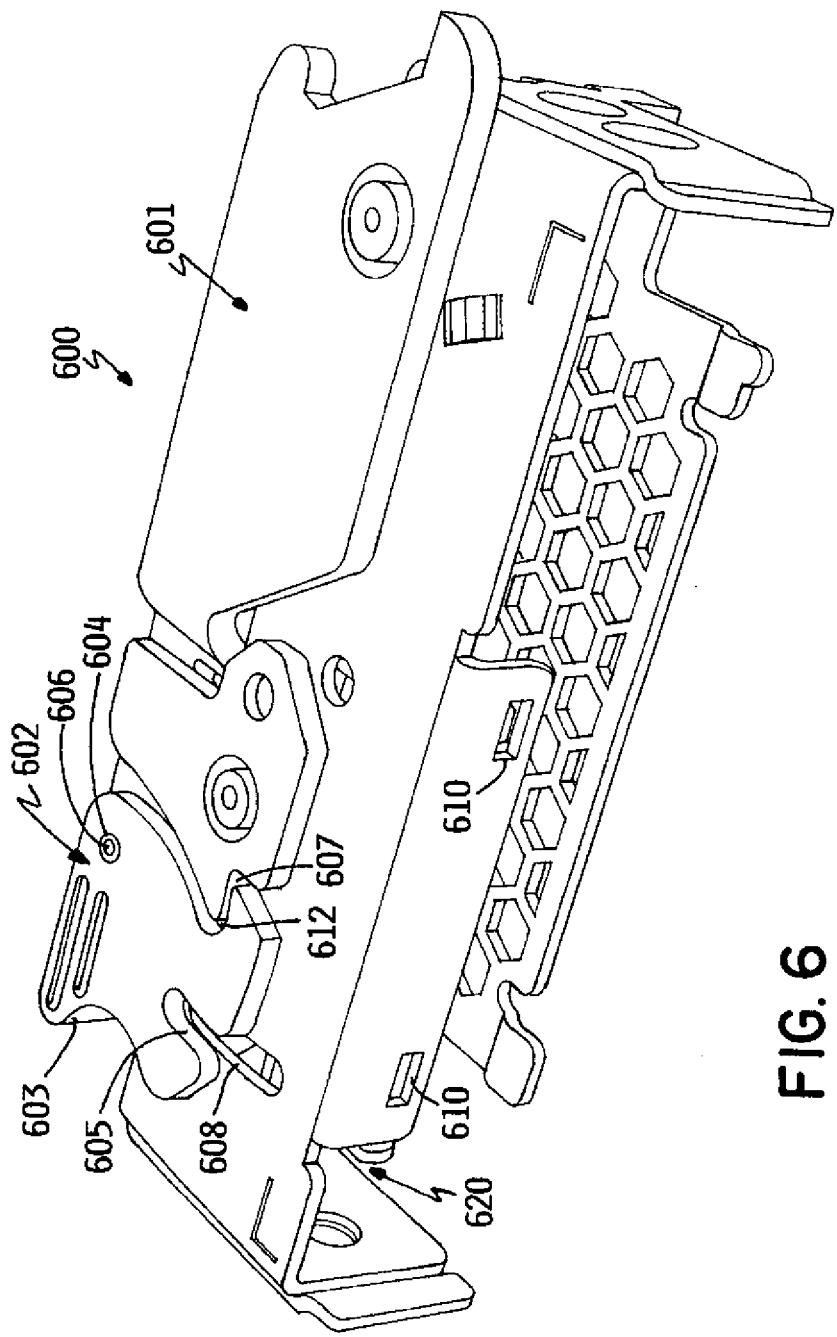
FIG. 6 illustrates a carrier suitable for use with the mechanism in FIGS. 1-4 and with the mechanism in FIG. 5

The manual release tab 310 is positioned approximately half way between the pivot point 124 and the locking pin 122, such that it will be aligned with the manual-release port 260 (FIG. 2) and will ride in the manual release slot 265. In operation, operators can manually toggle the actuator arm 120 from the locked position into the unlocked position by pushing a pin, or the like, against the manual release tab 310. The locking pin 122 is similarly positioned to slide-ably engages a locking slot 608 in the carrier 600 (FIG. 6). In this way, the locking pin 122 prevents the locking mechanism 100 from moving relative to the carrier 600 when engaged.

Figure 4:
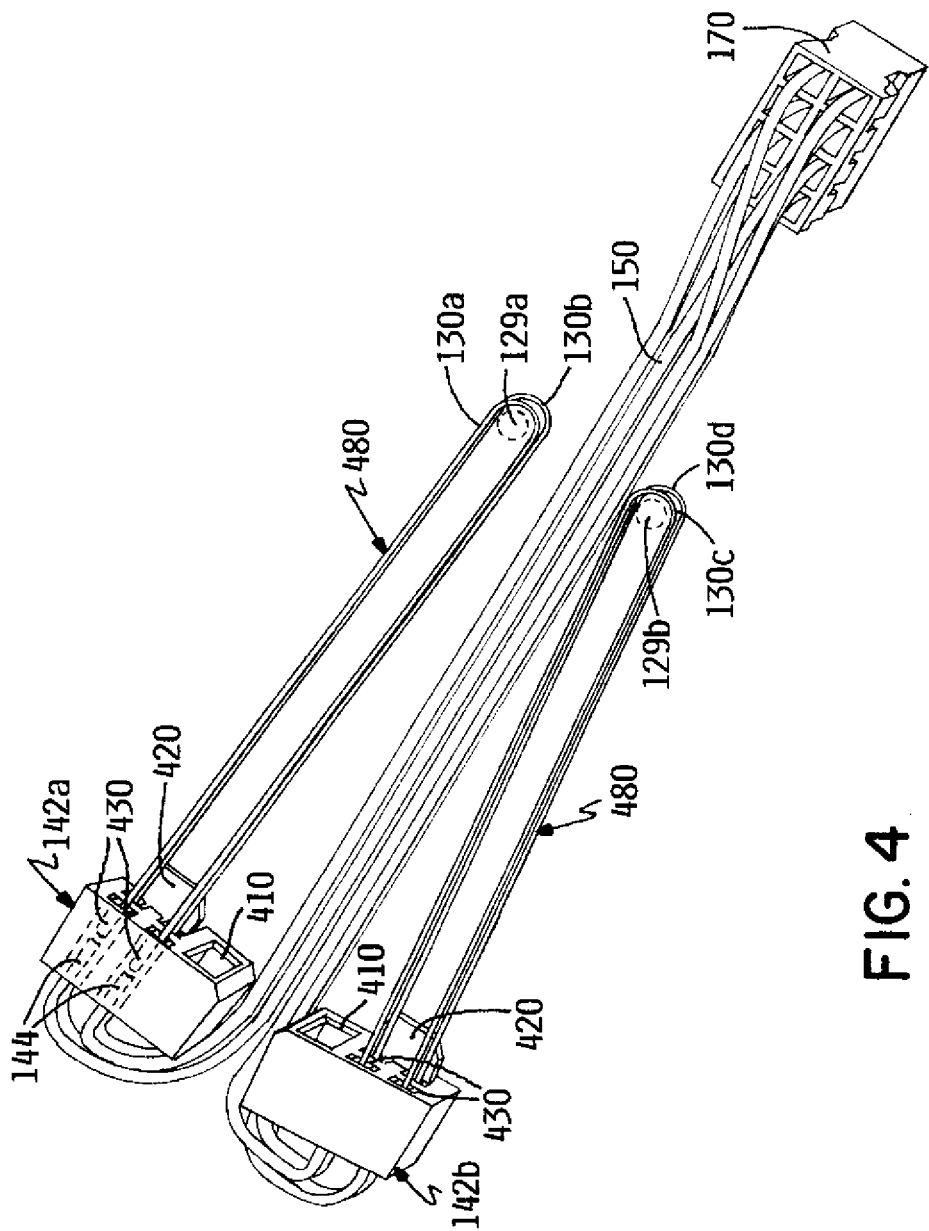
FIG. 4 illustrates one embodiment of the clockwise biasing wire connector, the counterclockwise wire connector, the SMA biasing wires, the signal wires, and the connector in more detail.

FIG. 4 illustrates the biasing wire connectors 142a and 142b, the SMA biasing wires 130a-130d, the signal wires 150, and the control connector 170 in more detail. The biasing wire connectors 142a and 142b each include a slot 410 and a tab 420 that slide-ably engage the guide tabs 211 and guide slots 210 (FIG. 2), respectively. The biasing wire connectors 142 each comprise four vias 144 (two of eight shown for clarity), one for each end 430 of the two associated SMA wires 130a-130d, forming loops 480. In this embodiment, the SMA wire loops 480 are positioned horizontally. This is desirable because wire connectors 142a and 142b and the frame 110 can be manufactured as separate pieces, which makes the components simpler and easier to manufacture. This embodiment 100 also utilizes redundant SMA wire loops 480 to improve reliability and signal wires 150. That is, this embodiment 100 is redundant all the way back to the DASD locking controller; only one functioning SMA wire loop 480 and signal wire 150 is required on either side of the actuator arm 120 to toggle the locking mechanism in this embodiment 100. This feature is particularly desirable for HA systems due to their focus on maximizing system readiness.

During assembly, the signal wires 150 and SMA wires 130a-130d are pre-assembled prior to insertion into the wire connectors 142a and 142b. The signal wires 150 are then fed through the wire connectors 142a and 142b, until crimps (not shown) connecting each of the signal wires 150 to the SMA wire 130a-130d are positioned inside of the vias 144, thereby electrically connecting the signal wires 150 and SMA wires 130a-130d and forming the loops 480. The signal wires 150 are then connected to the control connector 170. Next, the loops 480 are threaded above and below the shoulders 180a and 180b (FIG. 2) such that the individual SMA wires 130a-130d run through a guide slot 146a-146h. Next, the wire connectors 142a and 142b are inserted into and over the guide slots 210 and guide tabs 211 until they press against one of the guide shoulder 180a and 180b, and are held in place by the flexible latch 141. The ends 430 of the SMA wires 130a-130d are now securely held between the wire connectors 142a and 142b and the shoulders 180a and 180b. The SMA wires 130a-130d can then be looped around one of the guide posts 129a and 129b.

During operation, one set of SMA wires 130a-130b or 130c-130d are electrically heated, which causes that set of wires to decrease in length, pulling the guide posts 129a or 129b toward their respective shoulder 180a or 180b. However, because the pivot guide hole 220 (FIG. 2) and the pivot pin 124 (FIG. 1) prevent relative translational movement between the frame 110 and the actuator arm 120, the actuator arm 120 rotates in response to this force.

The SMA wires 130a-130d in this embodiment comprise a nickel-titanium alloy produced by Dynalloy, Inc. of Tustin, Calif. under the trademark Flexinol. Flexinol wires are desirable because the material will contract by about 2-4% in response to a temperature change of about 40-60 degrees Centigrade. Moreover, because Flexinol wires are can be made relatively small, the amount of electrical energy required to produce this temperature change is also correspondingly small. While Flexinol wires are suitable for this application, those skilled in the art will appreciate that any material that contracts upon application of heat is within the scope and spirit of the invention.

Figure 5:
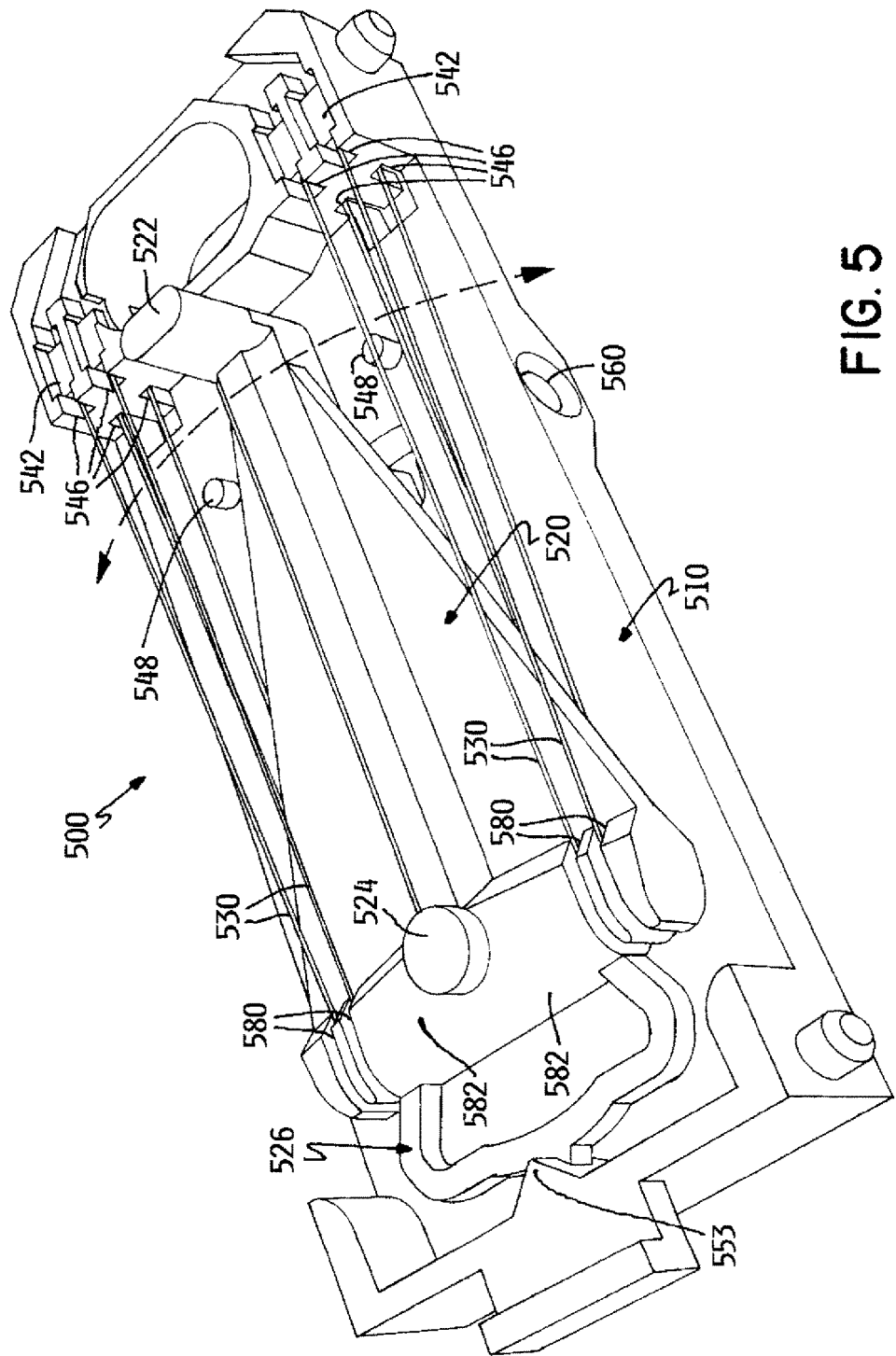
FIG. 5 illustrates a second embodiment of a shape-memory-alloy (SMA) computer-controlled locking and unlocking mechanism.

FIG. 5 illustrates a second embodiment of a locking mechanism 500. This locking mechanism comprises a frame 510 and an actuator arm 520. The frame 510 includes an integrated manual-release lever access port 560, eight integrated SMA wire termination features 542, eight SMA integrated wire guides 546, an over-center detent 553, and integrated actuator arm stops 548 (only some features shown and/or numbered for clarity). The wire termination features 542 and the wire guides 546 cooperate to fix the ends of the SMA wire loops 530 and to couple the SMA wires 530 to the signal wires (not shown). The actuator arm 520, in turn, includes an integrated pivot pin 524, an integrated over-centering cam 526, integrated locking pin 522, and four integrated four wire guides 580 offset from the pivot pin 524 by lever arms 582. The wire guides 580 position the SMA wire loops 530 in a vertical position in this embodiment. This locking mechanism 500 may be desirable because it comprises fewer overall parts than that shown in FIGS. 1-4.

FIG. 6 comprises detailed view of a carrier 600 suitable for use with the locking mechanism 100 in FIGS. 1-4 or with the locking mechanism 500 in FIG. 5. This carrier 600 embodiment is designed to accept DASD device 1020, such as that shown in FIGS. 9-10. The carrier 600 comprises a main latch 601 having a release tab 602 pivotally attached at one end; a carrier locking slot 608, four positioning slots 610 (two shown for clarity), a fixed catch 607, and a lock cavity 620. The release tab 602, in turn, comprises a thumb tab 603, a radial spring 604, a pivot point 606, and a tab locking slot 605, and a moveable catch 612. The side latches 250 (FIG. 2) and the positioning slots 610 hold one of the locking mechanisms 100 or 500 into locking aperture 620 such that their respective locking pins 122 or 522 can selectively engage the tab locking slot 605 through the carrier locking slot 608.

During normal operation of the DASD device, the radial spring 604 holds the moveable catch 612 against the fixed catch 607. When in this position, the main latch 601 is held engaged with its corresponding catch (not shown) and the carrier 600 cannot be removed from its rack (not shown). Human operators can release the carrier 600 from its rack (not shown) by applying force against the thumb tab 603. This force causes the release tab 602 to pivot around the pivot point 606, which in turn, releases the main latch 601 from its corresponding catch (not shown).

Figure 7:
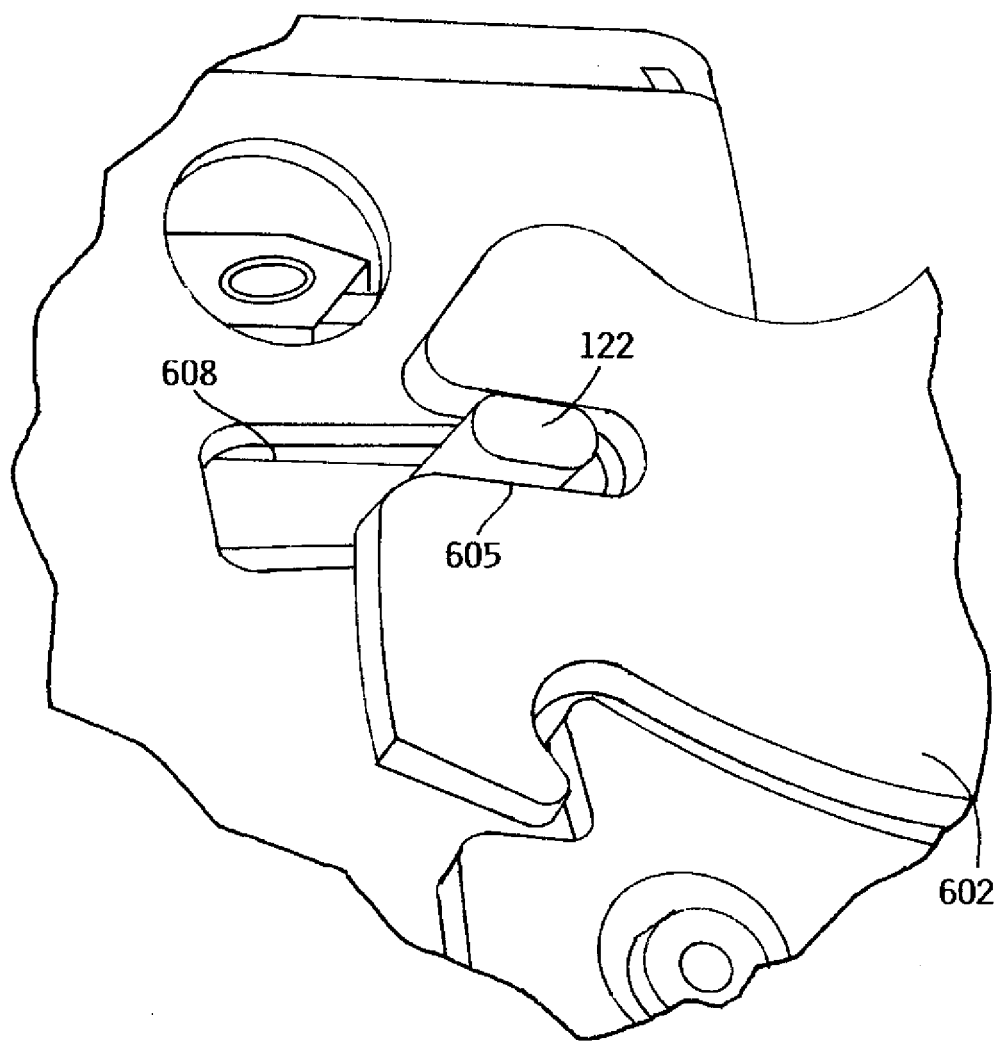
FIG. 7 comprises detailed view of a carrier in FIG. 6 in a locked position.
Figure 8:
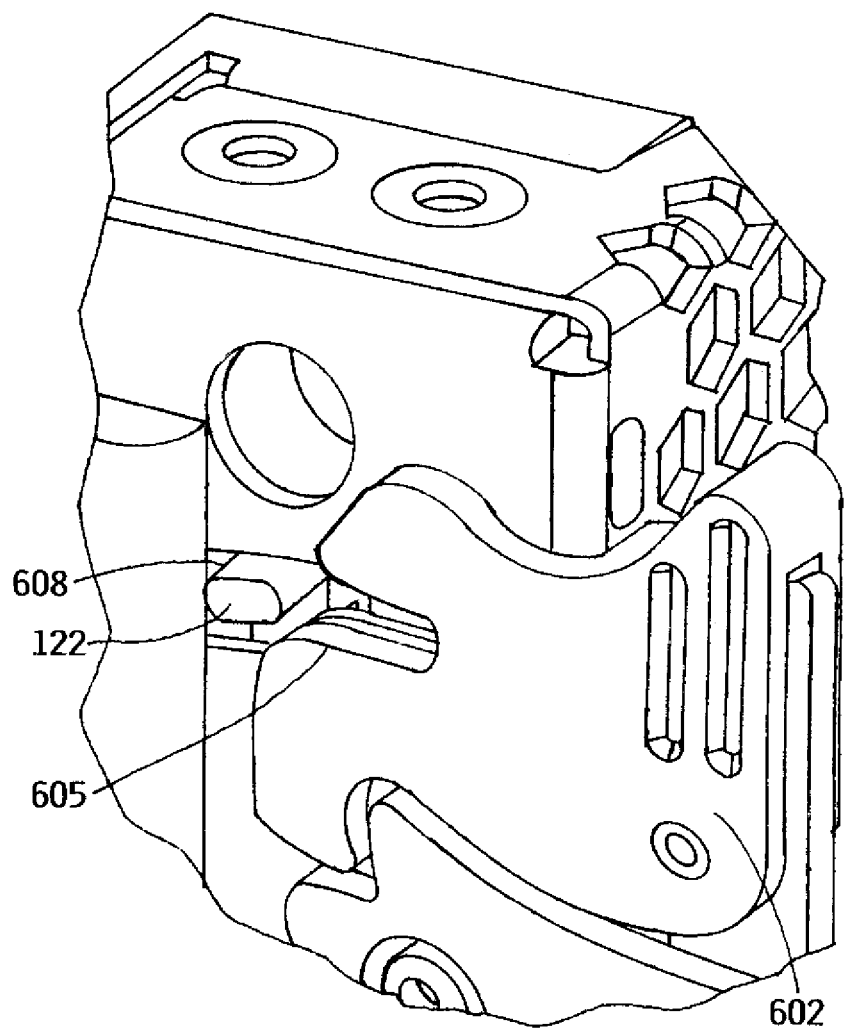
FIG. 8 comprises detailed view of a carrier in FIG. 6 in a locked position.

When the locking mechanism 100 or 500 is being toggled into its locked position, the locking pin 122 or 522 will pivot clockwise along the carrier locking slot 608 until engages with the tab locking slot 605 (best shown in FIG. 7). When in this position, the locking pin 122 or 522 prevents radial motion of the release tab 602 around pivot point 602, which prevents the main latch 601 from being disengaged from its corresponding catch (not shown). When the locking mechanism 100 or 500 is being toggled into the unlocked position, the locking pin 122 or 522 will pivot counter-clockwise along the carrier locking slot 608 until disengages from the tab locking slot 605 (best shown in FIG. 8). When in this position, the release tab 602 can pivot around pivot point 606, which allows the main latch 601 to be disengaged from its corresponding catch (not shown).

Figure 9:
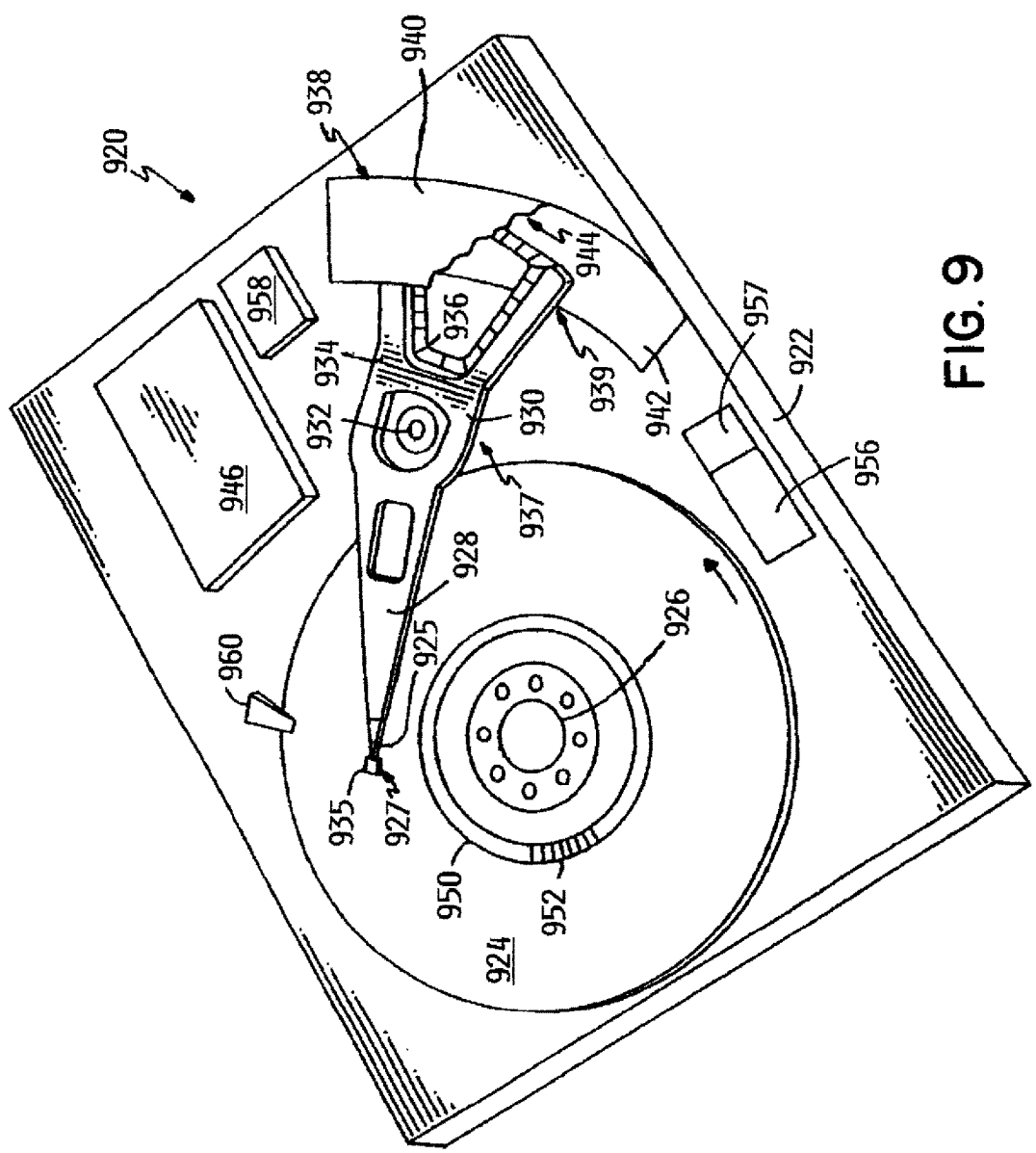
FIG. 9 illustrates a DASD device suitable for use with the locking mechanisms of FIGS. 1-8.

FIG. 9 depicts a DASD device 920 suitable for use with the carrier 600 and the locking mechanism 100 or 500. As is depicted in FIG. 9, each disk 924 is typically magnetically formatted to include a plurality of spaced concentric tracks 950. One or more of the disks 924 may alternatively be magnetically formatted to include a spiraled track configuration, or a combination of concentric and spiraled track configurations. Digital information is typically stored in the form of magnetic transitions along the tracks 950. The tracks 950 are generally divided into a number of sectors 952, with each sector 952 comprising a number of information fields, including fields for storing data, and sector identification and synchronization information, for example.

Writing data to a magnetic data storage disk 924 generally involves passing a current through the write element of the transducer assembly 927 to produce magnetic lines of flux which magnetize a specific location of the disk surface 924. Reading data from a specified disk location is typically accomplished by a read element of the transducer assembly 927 sensing the magnetic field or flux lines emanating from the magnetized locations of the disk surface 924. As the read element passes over the rotating disk surface 924, the interaction between the read element and the magnetized locations on the disk surface 924 results in the production of electrical signals, commonly referred to as readback signals, in the read element.

An actuator 930 typically includes a number of interleaved actuator arms 928 with each arm having one or more transducer 927 and slider assemblies 935 mounted to a load beam 925 for transferring information to and from the data storage disks 924. The slider 935 is typically designed as an aerodynamic lifting body that lifts the transducer 927 off the surface of the disk 924 as the rate of spindle motor rotation increases and causes the transducer 927 to hover above the disk 924 on an airbearing produced by high speed rotation of the disk 924. The distance between the slider 935 and the disk surface 924 is typically less than 40 nm.

The actuator 930 is typically mounted to a stationary actuator shaft 932 and rotates on the shaft 932 to move the actuator arms 928 into and out of the stack of data storage disks 924. A coil assembly 936, mounted to a coil frame 934 of the actuator 930, generally rotates within a gap 944 defined between the upper and lower magnet assemblies 940 and 942 of a permanent magnet structure 938 causing the actuator arms 928, in turn, to sweep over the surface of the data storage disks 924. The spindle motor 926 typically comprises a DC motor energized by a power supply 46 and adapted for rotating the data storage disks 924.

The coil assembly 936 and the upper and lower magnet assemblies 940 and 942 of the permanent magnet structure 938 operate in cooperation as an actuator voice coil motor 939 responsive to control signals produced by a servo processor 956. The servo processor 956 controls the direction and magnitude of control current supplied to the voice coil motor 939. The actuator voice coil motor 939 produces a torquing force on the actuator coil frame 934 when control currents of varying direction and magnitude flow in the coil assembly 936 in the presence of a magnetic field produced by the permanent magnet structure 938.

The torquing forces imparted on the actuator coil frame 934 cause corresponding rotational movement of the actuator arms 928 in directions dependent on the polarity of the control currents flowing in the coil assembly 936.

The data storage system 920 shown in FIG. 9 preferably employs a closed-loop servo control system for positioning the read/write transducers 927 to specified storage locations on the data storage disk 924. During normal data storage system operation, a servo transducer, generally mounted proximate the read/write transducers, or, alternatively, incorporated as the read element of the transducer assembly 927, is typically employed to read information for the purpose of following a specified track (i.e., track following) and locating (i.e., seeking) specified track and data sector locations on the disk surface 924.

In accordance with one servo technique, embedded servo pattern information is written to the disk 924 along segments extending in a direction generally outward from the center of the disk 924. The embedded servo patterns are thus formed between the data storing sectors of each track 950. It is noted that a servo sector typically contains a pattern of data, often termed a servo burst pattern, used to maintain optimum alignment of the read/write transducers 927 over the centerline of a track 950 when transferring data to and from specified data sectors on the track 950. The servo information may also include sector and track identification codes which are used to identify the location of the transducer assembly 927.

The servo processor 956, which cooperates with channel electronics 957, regulates the actuator voice coil motor 939 to move the actuator arms 928 and transducers 927 to prescribed track 950 and sector 952 locations when reading and writing data to and from the disks 924. The servo processor 956 is coupled to a disk drive controller 958. The disk drive controller 958 typically includes control circuitry and software that coordinate the transfer of data to and from the data storage disks 24. Although the servo processor 956 and disk drive controller 958 are depicted as two separate devices in FIG. 9, it is understood that the functionality of the servo processor 956 and disk drive controller 958 may be embodied in a single multi-purpose processor, which typically results in a reduced component cost.

FIG. 10 is a partially exploded front view of an enclosure 1050 showing the two power supplies 1021 and 1022 fully seated in the enclosure 1050. A DASD carrier 600, a front cover 1070, and a DASD filler 1072 are shown exploded from the enclosure 1050. Each DASD carrier 600 includes a locking mechanisms 100 or 500 for each DASD device 920. When one of the DASD's 920 is not used, a DASD blank cartridge 1076 may be used to preserve cooling air flow. If a DASD carrier 600 is not used, a DASD filler 1072 is used to cover its empty bay to preserve cooling air flow. Finally, a front cover 1070 is placed over the front of the enclosure.

Although the present invention has been described in detail with reference to certain examples thereof, it may be also embodied in other specific forms without departing from the essential spirit or attributes thereof. For example, in some embodiments, the actuator arms 120 could be configured to move in a linearly inward and outward motion relative to the frame 110, as opposed to the pivotal movement described in FIGS. 1-4 and 5. In addition, while the preferred embodiment utilizes a thermoplastic material to minimize weight and for ease of fabrication, the components described herein can be made from any number of materials, including steel and aluminum.

The present invention offers numerous advantages over conventional HA device locking methods. Embodiments of the present invention that rely on SMA wire actuators are comparably lighter, smaller, and cheaper than conventional, conventional solenoid-based solutions. Additionally, the SMA actuator based embodiments shown in FIGS. 1-8 may require significant less electrical power for actuation than required by conventional solenoids, and thus, may create comparatively smaller magnetic fields. Those skilled in the art will recognize that these magnetic fields can be problematic when used around critical computer devices.

The accompanying figures and this description depicted and described embodiments of the present invention, and features and components thereof. Those skilled in the art will appreciate that any particular nomenclature used in this description was merely for convenience, and thus the invention should not be limited to use solely in any specific application or orientation identified and/or implied by such nomenclature. Furthermore, although features and advantages of the present invention have been described with reference to HA computers and DASD devices, those skilled in the art will appreciate that these features and advantages apply equally to other types of systems. Therefore, it is desired that the embodiments described herein be considered in all respects as illustrative, not restrictive, and that reference be made to the appended claims for determining the scope of the invention.

We claim:
1. A method comprising:
electrically heating a first shape memory alloy wire strung between a first guide shoulder of a frame and a first guide post of an actuator arm to rotate the actuator arm relative to the frame from an unlocked position into a locked position; and
electrically heating a second shape memory alloy actuator wire strung between a second guide shoulder of the frame and a second guide post of the actuator arm to rotate the actuator arm relative to the frame from the locked position into the unlocked position,
wherein in the locked position, a locking pin of the actuator arm engages a locking slot in a carrier to prevent movement of a release tab, which prevents movement of a fixing catch, which prevents removal of the carrier from a device rack in which the carrier is disposed,
and wherein the actuator arm comprises an integrated curved spring member that, when the actuator arm has a current position that is one of the locked or unlocked position, maintains the actuator arm in the current position when the electrical power is withdrawn.
2. The method of claim 1, wherein the actuator arm includes an over-center feature.
3. The method of claim 2, wherein the over-center feature of the actuator arm comprises the integrated curved spring member.
4. The method of claim 1, wherein the first and second shape memory alloy wires each comprise redundant actuator structures.
5. The method of claim 1, wherein in the unlocked position, the locking pin disengages from the locking slot to permit removal of the carrier from the device rack.
6. A method comprising:
electrically heating a first shape memory alloy wire between a frame and an actuator arm to rotate the actuator arm relative to the frame from an unlocked position to a locked position; and
electrically heating a second shape memory alloy wire strung between the frame and the actuator arm to rotate the actuator arm relative to the frame from the locked position to the unlocked position,
wherein in the locked position, the actuator arm prevents movement of a release tab, which prevents movement of a catch,
and wherein the actuator arm comprises a integrated curved spring member that, when the actuator arm has a current position that is one of the locked or unlocked position, maintains the actuator arm in the current position when the electrical power is withdrawn.

7. The method of claim 6, wherein in the locked position, a locking pin of the actuator arm engages a locking slot, which prevents movement of the release tab.

8. The method of claim 7, wherein the locking slot is part of a carrier, and preventing of movement of the catch prevents removal of the carrier from a device rack in which the carrier is disposed.

9. A method comprising:
   electrically heating a first shape memory alloy wire to rotate an actuator arm from an unlocked position to a locked position; and
   electrically heating a second shape memory alloy to rotate the actuator arm from the locked position to the unlocked position,
   wherein in the locked position, the actuator arm prevents movement of a release tab, which prevents movement of a catch,
   and wherein the actuator arm comprises an integrated curved spring member that, when the actuator arm has a current position that is one of the locked or unlocked position, maintains the actuator arm in the current position when the electrical power is withdrawn.

10. The method of claim 9, wherein each of the first shape memory alloy wire and the second shape memory alloy wire is disposed between a frame and the actuator arm.

11. The method of claim 9, wherein in the locked position, a locking pin of the actuator arm engages a locking slot, which prevents movement of the release tab.

12. The method of claim 11, wherein the locking slot is part of a carrier, and preventing of movement of the catch prevents removal of the carrier from a device rack in which the carrier is disposed.

* * * * *